May 12, 1964 S. E. FAREKAS 3,132,882
FACE PLATE LOCKING MEANS
Filed March 16, 1962
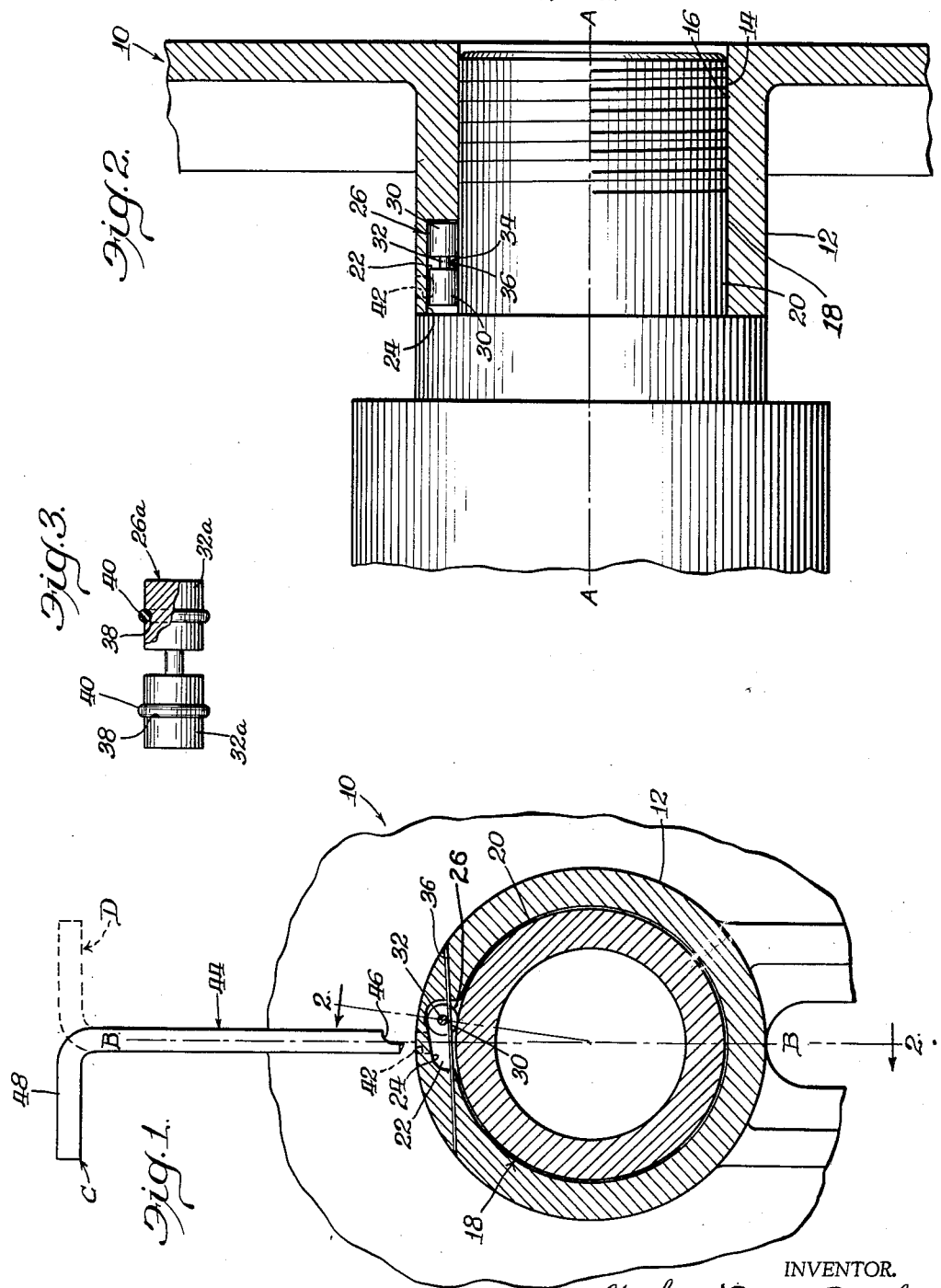
INVENTOR.
Stephen Emery Farekas 3,132,882
FACE PLATE LOCKING MEANS
Stephen Emery Farekas, South Bend, Ind., assignor to Amsted Industries Incorporated, Chicago, Ill., a corporation of New Jersey
Filed Mar. 16, 1962, Ser. No. 180,077
4 Claims. (Cl. 287—53)

My invention relates to locking means and more particularly to means for locking a face plate or other threaded member onto the spindle of a lathe or the like.

In various machine tools, a face plate or other threaded member is threaded onto a spindle. If a braking force is applied to the rotating spindle having such a member threadably secured thereto, a danger exists of the member unscrewing itself from the spindle because of the member's momentum. The member may be secured to the spindle by means of a pin or a set screw; however, this method has the disadvantage of taking considerable time to assemble and disassemble.

An object of this invention is to provide a simple arrangement on the threaded member to accommodate threading of the member onto the spindle but automatically locking to prevent removal of the member therefrom. The danger of the member becoming unscrewed from the spindle when a brake is applied is therefore eliminated.

Another object of this invention is to provide a simple means to disable the automatic locking arrangement to facilitate removal of the member from the spindle when required.

These and further objects will become apparent from the following description and the accompanying drawings in which:

FIGURE 1 is a fragmentary sectional view showing a threaded member in the form of a face plate mounted on the threaded nose of a lathe spindle. The face plate is viewed from its hub end;

FIGURE 2 is a sectional view of the same, substantially on the line 2—2 of FIGURE 1; and FIGURE 3 is an enlarged detail of a modification of the locking roller used in the locking arrangement.

Referring to the drawings, FIGURES 1 and 2, a face plate, generally designated 10, is shown having a hub 12 on its rearward surface. The hub 12 is threaded, as at 14, for reception onto a threaded portion 16 of an associated spindle 18 of a lathe, or the like. The spindle 18 has a cylindrical bearing surface 20, rearwardly of its threaded portion 16. The hub 12 has a tapered groove 22 on its inner wall, preferably, rearwardly of threaded portion 14. Groove 22 may have one end thereof communicating with the inward end of hub 12, as shown. The groove 22 is formed with a tapered bottom surface 24 so that one end of the groove is deeper than the other when viewed in transverse cross section as in FIGURE 1. The deeper end of the groove 22 is large enough to accommodate a roller 26. The overall length of the roller 26 is preferably, slightly less than the width of groove 22.

Roller 26 may include two spaced, axially aligned, end portions 30 preferably having substantially equal diameters and a smaller cylindrical portion 32 axially aligned between the end portions 30. An annular recess 34 is defined in the roller between the end portions 30 and radially outwardly from central portion 32. A retaining pin 36 is adapted to retain roller 26 within groove 22. Pin 36 is adapted to extend through groove 22 transversely of axis A—A of hub 12 and to pass through recess 34 between cylindrical portion 32 and bearing surface 20, substantially as shown. Pin 36 is slightly smaller in diameter than the length of portion 32 so that the pin 36 will substantially fill the width of recess 34 but without frictional engagement therewith. Pin 36 therefore serves to guide roller 26, keeping its axis substantially parallel to axis A—A thereby preventing the roller 26 from jamming in groove 22. When the face plate 10 is threadably engaged with the spindle 18, the cylindrical surface of roller 26 is axially parallel with, and in contact with, bearing surface 20.

FIGURE 3 shows an alternate embodiment of the roller 26, shown in FIGURE 2. A roller, generally designated at 26a, has an annular groove 38 formed, preferably, centrally in each of the end portions 32a to accommodate a rubber O ring 40 that is utilized to produce a greater coefficient of friction thereby facilitating urging the roller 26 toward the small end of the tapered groove when the face plate is rotated in one direction but not in the other. It is understood that more than one such annular groove 38 and rubber O ring 40 could be used, spaced along the roller 26a.

In actual use, in the arrangement as shown in FIGURE 1, while the face plate 10 is being threaded onto the spindle in a counter-clockwise direction, the roller 26 will be urged along the cylindrical surface 20 toward the deep portion of groove 22 causing no wedging action therebetween. During operation of the machine, the spindle 18 and face plate 10 are rotating in a clockwise direction. If braking is applied to the spindle causing it to stop suddenly, face plate 10 will try to continue to rotate out of its threaded engagement with the spindle 18. If it does so continue to rotate in a clockwise direction, the roller 26 will wedge between the surface 24 of the tapered groove and cylindrical surface 20 thereby effectively stopping such rotation.

An opening 42 is formed through the wall of the hub 12 communicating with the central portion of the tapered groove 22. The axis B—B of said opening 42 is preferably radially aligned and perpendicular to the rotational axis A—A. A key 44 is adapted to be received in opening 42, said key having a notched portion 46 formed on the end thereof being adapted to fit between the cylindrical surface of one of the end portions 30 and the small end of the tapered groove when the roller 26 is in wedged position. Key 44 may be provided with a handle 48 projecting radially outward as shown in position C of FIGURE 1. Rotation of key 36, 180°, wherein handle 48 would assume position D, will cause notched portion 46 to rotate toward the deeper portion of groove 22 thereby urging the roller 26 by cam action out of wedge engagement and into the deepest portion of groove 22 whereby no wedging action can occur. Key 44 retains roller 26 as long as it is positioned in opening 42 in position D, permitting the face plate 10 to be unthreaded and removed from the spindle 18.

It is understood that various changes may be made in the construction, for and arrangement without departing from thespirit of my invention. It is further understood that all matters herein are to be interpreted as illustrative and not in any sense limited as shown.

I claim:
1. In a locking means to secure a threaded member on a driven spindle, wherein the threaded member is freely rotatable into threaded engagement with the spindle, the combination of a hub formed on said member, said hub having a tapered groove on the inner periphery thereof rearwardly of said threaded portion, said groove being disposed circumferentially and being deeper at one end than the other, said spindle having a peripheral bearing area communicating with said tapered groove when said member is threadably engaged with said spindle, a locking roller adapted to be received within the deeper portion of said groove, said roller having resilient means thereon adapted to engage said tapered groove and also to engage said peripheral bearing area on said spindle causing a wedging engagement therebetween when the member starts to unthread from the driven spindle, an annular recess formed in the outer periphery of said roller, a pin disposed to extend through said groove and extend transversely to the rotational axis of said member, said pin adapted to pass through said recess adjacent said spindle to retain said roller in said groove, said hub having an opening communicating centrally with said groove for the reception of a key having a notched portion thereon to urge the roller into the deeper portion of the groove and retain it there preventing wedging action when the member is being removed from the spindle.

2. In a locking means to secure a threaded member on a driven spindle, wherein the threaded member is freely rotatable into threaded engagement with the spindle, the combination of a hub formed on said member, said hub having a tapered groove on the inner periphery thereof rearwardly of said threaded portion, said groove being disposed circumferentially and being deeper at one end than the other, said spindle having a peripheral bearing area communicating with said tapered groove when said member is threadably engaged with said spindle, a locking roller adapted to be received within the deeper portion of said groove, said roller having resilient means thereon adapted to engage said tapered groove and also to engage said peripheral bearing area on said spindle causing a wedging engagement therebetween when the member starts to unthread from the driven spindle, an annular recess formed in the outer periphery of said roller, and a pin disposed to extend through said groove and extend transversely to the rotational axis of said member, said pin adapted to pass through said recess adjacent said spindle to retain said roller in said groove.

3. In a locking means to secure a hollow threaded member on a driven spindle member, the combination of a hub formed on said hollow member, said hub having an internal threaded portion and having a substantially cylindrical inner periphery rearwardly of said threaded portion, said spindle member having a substantially cylindrical outer periphery disposed within said inner periphery and said spindle member having external threads mated with said threaded portion, a circumferentially extending tapered groove in one of said peripheries, said groove being deeper at one end than the other, a locking roller received within the deeper end of the groove, said roller having resilient means thereon engaging one of said members in the groove and engaging the other member's cylindrical periphery causing a wedging engagement therebetween when the hollow member starts to unthread from the driven spindle member, an annular recess in the outer perimeter of said roller, and a pin extending through said groove and extending transversely to the rotational axis of said hollow member, said pin being snugly fitted in said recess to maintain the roller's rotational axis substantially parallel to that of the hollow member thereby preventing jamming of the roller in said groove.

4. In combination, inner and outer telescopically engaged members having mutually facing circumferential surfaces, a circumferentially extending groove in one of said surfaces, one end of said groove being deeper than the other end, axially spaced, coaxial rollers in said groove, a shaft portion connecting said rollers, a guide pin located in one of said members and extending between said rollers, the diameter of the pin being slightly smaller than the length of the shaft portion, so that the pin substantially fills the space between the rollers to keep their axis substantially parallel to the axis of said members, each of said rollers having an annular recess, and a resilient O ring mounted in each of said annular recesses, said rollers when located in the deeper end of the groove permitting relative rotation of said members and when located in the other end of said groove preventing relative rotation of said members.

References Cited in the file of this patent

UNITED STATES PATENTS

| | | |
|---|---|---|
| 599,783 | Hogan | Mar. 1, 1893 |
| 743,932 | Rudd | Nov. 10, 1903 |
| 771,951 | Wahlstrom | Oct. 11, 1904 |
| 965,131 | Bliss | July 19, 1910 |
| 1,011,422 | Fernandez | Dec. 12, 1911 |
| 1,029,663 | Bowersock | June 18, 1912 |
| 1,087,315 | Packer | Feb. 17, 1914 |
| 1,209,393 | Campbell | Dec. 7, 1916 |
| 1,560,924 | Weston | Nov. 10, 1925 |
| 1,889,063 | Dunham | Nov. 29, 1932 |
| 2,710,206 | Huber | June 7, 1955 |
| 2,845,106 | Baker | July 29, 1958 |